(12) United States Patent
Wilkerson et al.

(10) Patent No.: US 6,662,273 B1
(45) Date of Patent: Dec. 9, 2003

(54) LEAST CRITICAL USED REPLACEMENT WITH CRITICAL CACHE

(75) Inventors: Christopher B. Wilkerson, Portland, OR (US); Srikanth T. Srinivasan, Durham, NC (US); Dz-ching Ju, Saratoga, CA (US)

(73) Assignee: Intel Corporation

( * ) Notice: Subject to any disclaimer, the term of this patent is extended or adjusted under 35 U.S.C. 154(b) by 288 days.

(21) Appl. No.: 09/676,522

(22) Filed: Sep. 29, 2000

(51) Int. Cl.[7] .................... G06F 12/00; G06F 12/14; G06F 12/16; G06F 13/00; G06F 13/28
(52) U.S. Cl. ........................ 711/133; 712/216
(58) Field of Search .................. 711/133, 134

(56) References Cited

U.S. PATENT DOCUMENTS

| | | | |
|---|---|---|---|
| 4,888,679 A | 12/1989 | Fossum et al. | 712/2 |
| 5,109,498 A | 4/1992 | Kamiya et al. | 365/189.05 |
| 5,146,578 A | 9/1992 | Zangenehpour | 711/137 |
| 5,214,766 A | 5/1993 | Liu | 711/124 |
| 5,261,053 A | 11/1993 | Valencia | 711/133 |
| 5,317,718 A | 5/1994 | Jouppi | 711/122 |
| 5,377,336 A | 12/1994 | Eickemeyer et al. | 712/207 |
| 5,497,499 A * | 3/1996 | Garg et al. | 712/217 |
| 5,664,147 A | 9/1997 | Mayfield | 711/137 |
| 5,737,624 A * | 4/1998 | Garg et al. | 712/23 |
| 5,758,119 A | 5/1998 | Mayfield et al. | 711/122 |
| 5,761,706 A | 6/1998 | Kessler et al. | 711/118 |
| 5,822,764 A | 10/1998 | Hardage, et al. | 711/145 |
| 5,838,945 A | 11/1998 | Emberson | 712/200 |
| 5,974,526 A * | 10/1999 | Garg et al. | 712/23 |
| 6,000,007 A | 12/1999 | Leung et al. | 365/230.03 |
| 6,073,215 A | 6/2000 | Snyder | 711/137 |
| 6,085,289 A | 7/2000 | Thatcher et al. | 711/118 |
| 6,131,145 A | 10/2000 | Matsubara et al. | 711/122 |
| 6,134,643 A | 10/2000 | Kedem et al. | 711/137 |
| 6,167,509 A | 12/2000 | Sites et al. | 712/237 |
| 6,195,735 B1 | 2/2001 | Krueger et al. | 711/204 |
| 6,223,256 B1 | 4/2001 | Gaither | 711/134 |
| 6,263,404 B1 | 7/2001 | Borkenhagen et al. | 711/137 |
| 6,289,433 B1 * | 9/2001 | Garg et al. | 712/23 |
| 6,360,297 B1 | 3/2002 | Arimilli et al. | 711/122 |
| 6,381,679 B1 | 4/2002 | Matsubara et al. | 711/122 |
| 2001/0027515 A1 | 10/2001 | Ukai et al. | 712/207 |
| 2002/0087794 A1 | 7/2002 | Jouppi et al. | 711/126 |
| 2002/0156962 A1 | 10/2002 | Chopra et al. | 711/3 |

OTHER PUBLICATIONS

Kumar, Sanjeev and Wilkerson, Christopher; "Exploiting Spatial Locality in Data Caches using Spatial Footprints"; Proceedings of 25th Annual ACM/IEEE International Symposium on Computer Architecture; (ISCA '98); pp. 1–12.

* cited by examiner

Primary Examiner—Kevin Verbrugge
(74) Attorney, Agent, or Firm—Marger Johnson & McCollom, P.C.

(57) ABSTRACT

The critical cache tracks a critical score for each cache line in the critical cache. On cache hits, the critical score of the hit cache line is incremented by an instance score assigned to the data request. On cache misses, data may be retrieved from main memory without allocating a cache line into the critical cache, in which case the instance score is subtracted from the critical scores of all cache lines in the cache. Alternatively on a cache miss, the cache line with the smallest critical score is removed from the cache. The smallest critical score is then subtracted from each cache line in the critical cache. A new cache line is allocated that satisfies the data request, and the new cache line is given the instance score of the data request as a critical score.

38 Claims, 15 Drawing Sheets

LEAST CRITICAL USED REPLACEMENT WITH CRITICAL CACHE

RELATED APPLICATION DATA

This application is related to co-pending U.S. patent application Ser. No. 09/675,983, titled "RUNTIME CRITICAL LOAD/DATA ORDERING" and to co-pending U.S. patent application Ser. No. 09/675,713, titled "CRITICAL LOADS GUIDED DATA PREFETCHING," both filed simultaneously herewith and commonly assigned.

FIELD OF THE INVENTION

This invention pertains to caching data on a computer, and more particularly to a cache implementing a replacement technique based on data criticality.

BACKGROUND OF THE INVENTION

When computers first became available, they ran programs by executing instructions using in-order execution. Before instruction number two could be executed, instruction number one had to complete. Since clock speeds were relatively slow, this was not a significant issue. The processor could not execute complicated instructions much faster than any other part of the computer could support the instruction. But modem processors are much more efficient than their ancestors were. Modem computers are capable of running at very high clock rates and may perform complicated instructions in very few clock cycles.

But while processor clock speeds have increased dramatically, improvements in other parts of the computer have been less significant. Specifically, at the high clock rates in modem processors, it may take thousands of clock cycles to access data from memory. In an in-order instruction processor, the processor must wait for a memory access to complete before it may continue with the next instruction. This may cause significant delay in program execution. To deal with this problem, processors began to run programs using out-of-order execution. While one complicated instruction is delayed (for example, due to a memory access), other instructions that do not depend on the delayed instruction may be executed.

For out-of-order execution to work, the processor needs to be able to do several things. First, the processor determines whether a later instruction is dependent on the delayed instruction. For example, consider the situation where a value is loaded from memory into a register in the processor. If a later instruction adds the value in that register to another value in another register, this later instruction is dependent on the delayed instruction: it may not execute until after the load instruction completes. On the other hand, an add instruction that adds two registers that are totally unrelated to the load instruction may be executed while the value is loaded from memory, even though the exact instruction order suggests that this add instruction should not execute yet.

Second, the processor buffers any dependent instructions for later execution. If the processor detects that a later instruction is dependent on a delayed load instruction, the later instruction may not be executed out-of-order, and is buffered until after the load instruction completes.

Third, the processor renames registers. A register may be renamed when a later instruction that is not dependent on the delayed load instruction uses a register that is used by the delayed load instruction. In this case, the processor needs to be able to rename the register used by the later instruction so that the "parallel execution" of the load instruction and the later instruction does not create a conflict.

FIG. 1 shows how a processor in the prior art operates. Processor 105 receives instruction sequence 110. While a load instruction is pending, processor 105 examines later instructions to see if they are dependent on the delayed load instruction. If the later instruction is dependent on the delayed load instruction, the later instruction is buffered in buffer 115. Otherwise, the later instruction may be executed out-of-order, and joins executed instructions 120.

Two concerns may arise that limit the effectiveness of out-of-order execution. First, processor 105 may fill buffer 115 with dependent instructions. Once the buffer is full, processor 105 may not add any more instructions to buffer 115, and all later instructions have to wait until the delayed load instruction completes. Second, the program may include a branch instruction after the load instruction. Even with branch prediction, processor 105 may not execute the instructions without some way to reverse the process in case the branch prediction was incorrect. Typically, processor 105 will simply buffer the instructions rather than execute and risk having to rewind the program execution.

The problems with out-of-order execution are exacerbated by the possibility of multiple load instructions within a relatively small block of instructions. With multiple independent load instructions, if the load instructions are executed in their original order, the processor may be more inefficient than it needs to be.

Other problems related to load instruction delays have to do with caching. Cache lines containing data requested by load instructions may be removed from the cache even though other nearby data will be requested shortly. And cache lines containing data that may be loaded shortly may not be fetched into the cache in advance of their need.

The present invention addresses these and other problems associated with the prior art.

DETAILED DESCRIPTION

Figure 1:
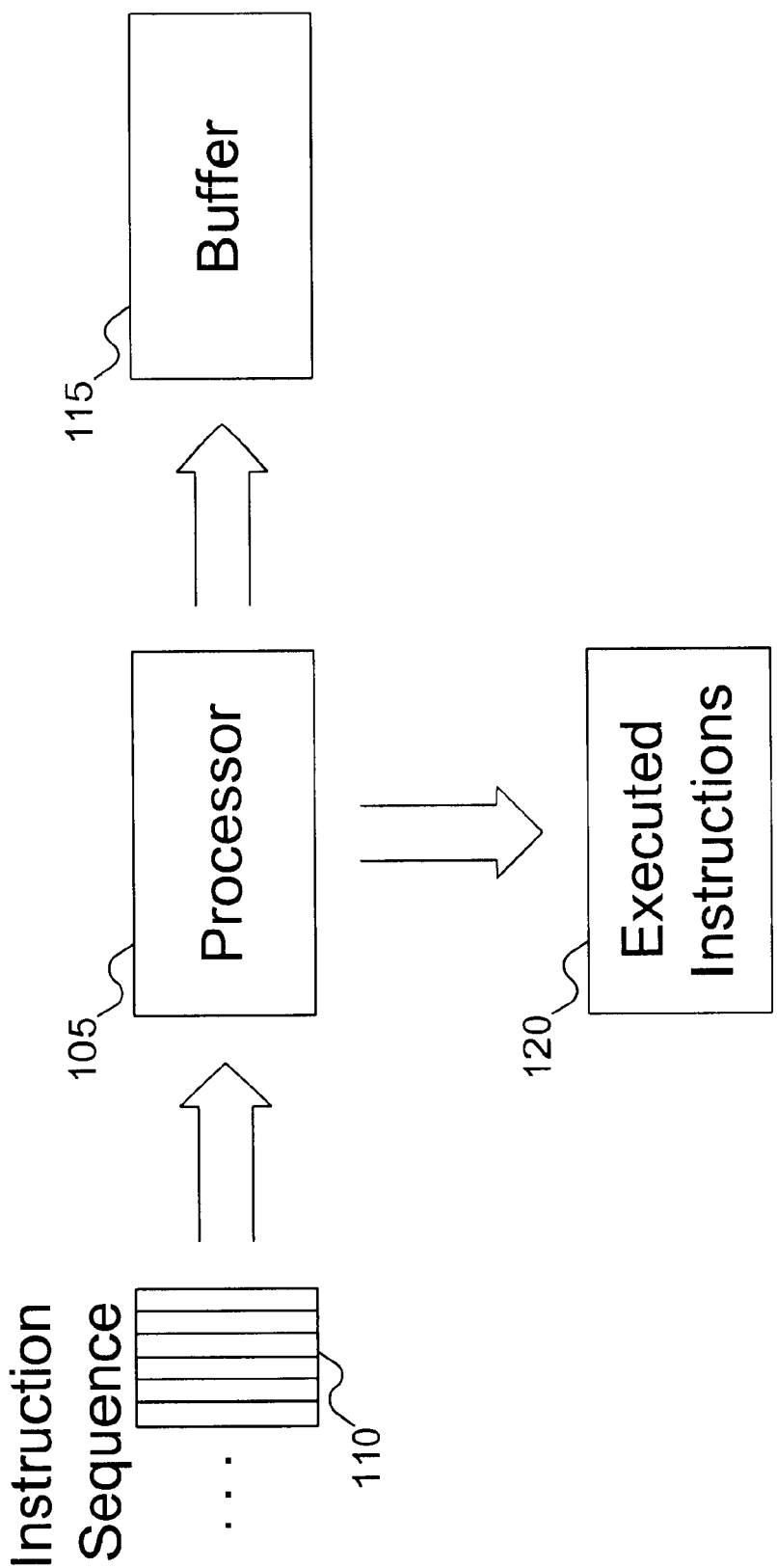
FIG. 1 shows a prior art processor performing out-of-order execution of instructions.
Figure 2:
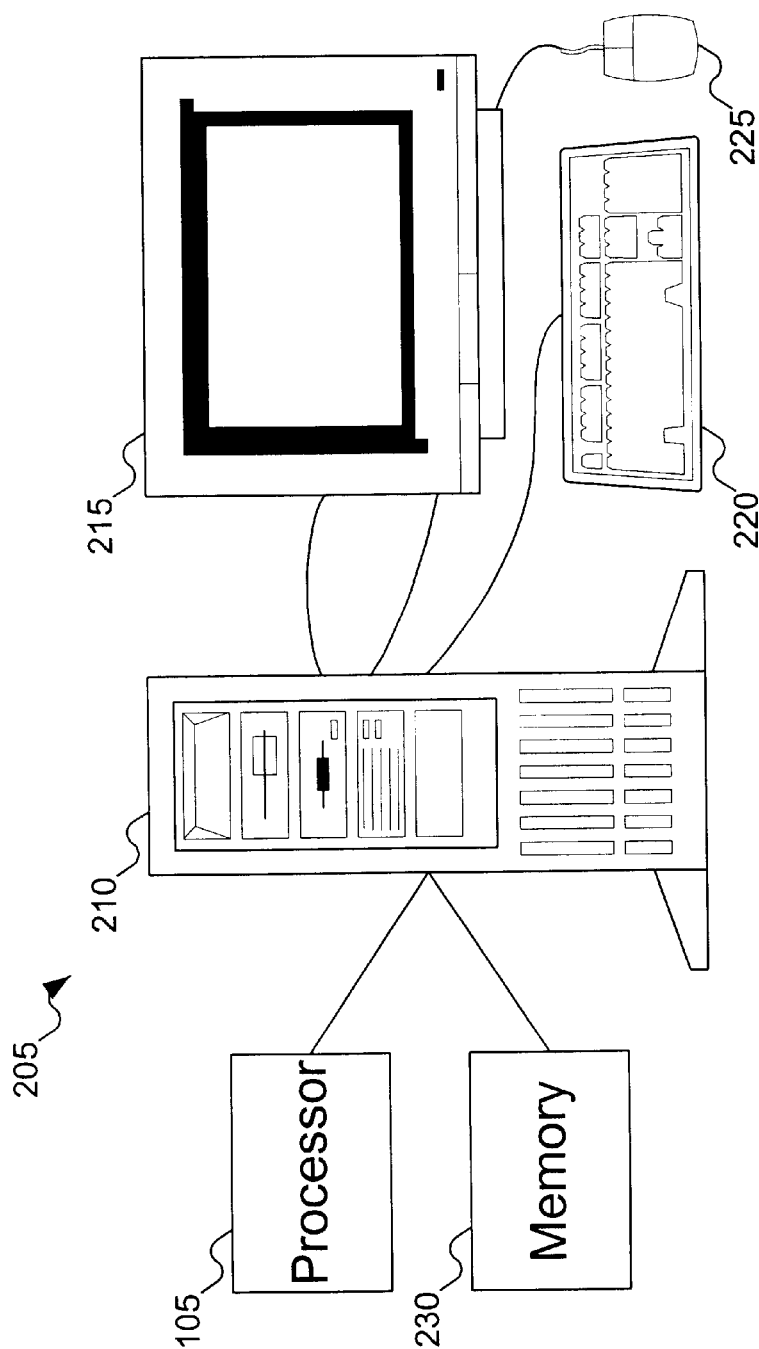
FIG. 2 shows a computer system that may identify critical loads, prefetch data for critical loads, and include a critical cache using a least critical used cache line replacement policy.

FIG. 2 shows a computer system 205 in accordance with the invention. Computer system 205 includes a computer 210, a monitor 215, a keyboard 220, and a mouse 225. Computer 210 includes hardware components, such as a processor 105, a memory 230, and a cache (not shown). Computer system 205 may also include other equipment not shown in FIG. 2, for example, other input/output equipment or a printer.

Figure 3:
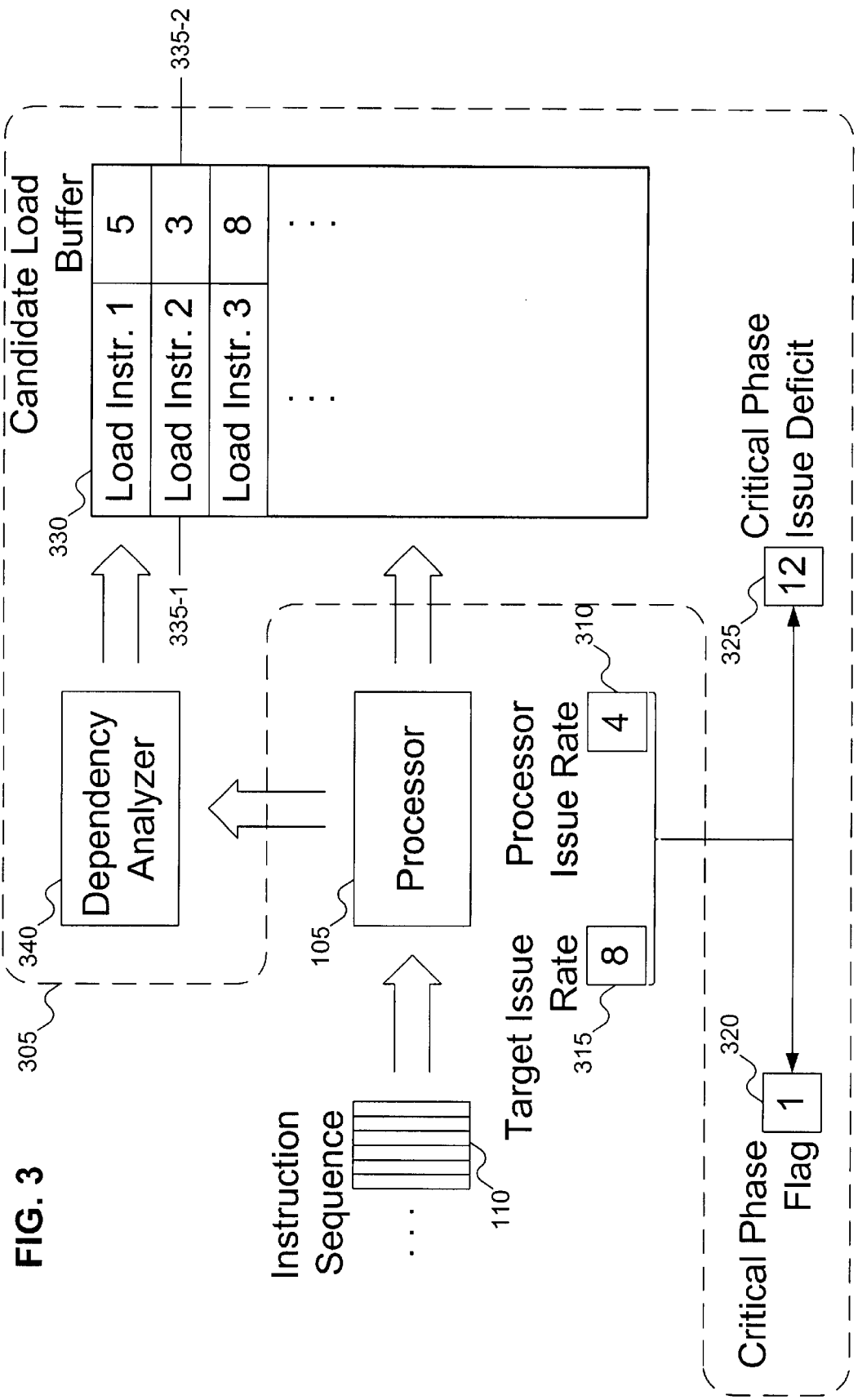
FIG. 3 shows a critical load ordering unit operable on the computer system of FIG. 2.

Critical Load Ordering:

FIG. 3 shows a critical load ordering unit operable on the computer system of FIG. 2. In FIG. 3, processor 105 is processing instructions 110. When a load instruction is reached which is delayed because the load accesses the main memory, processor 105 begins to issue instructions that are ready to execute (i.e., all the operands of the instruction are available). When processor issue rate 310 drops below target issue rate 315, processor 105 begins using critical load ordering unit 305. (Target issue rate 315 is the target rate at which processor 105 issues instructions, whereas processor issue rate 310 is the actual rate at which the processor is currently issuing instructions.) Critical load ordering unit 305 begins by setting critical phase flag 320 and initializing critical phase issue deficit 325. Critical phase flag 320 is a flag indicating that processor 105 is currently in a critical phase. Critical phase issue deficit 325 measures how many instructions the processor has fallen short of the target during the critical phase.

In an embodiment of the invention, a critical phase, once begun, lasts for a fixed number of cycles. But a person skilled in the art will recognize that the critical phase may terminate based on other conditions. For example, the critical phase may terminate when processor issue rate 310 meets or exceeds target issue rate 315.

Critical load ordering unit 305 includes candidate load buffer 330. Candidate load buffer stores candidate loads detected during a critical phase. Associated with each candidate load is a dependence count. The dependence count represents the number of instructions that are dependent on the value obtained by the load instruction. For example, in FIG. 3, load instruction 2 335-1 has a dependence count 335-2 of 3, indicating that three instructions depend on load instruction 2.

During a critical phase, critical load ordering unit 305 considers each instruction examined by the processor. If the instruction is a load instruction, critical load ordering unit 305 adds the load instruction to candidate load buffer 330 and assigns the load instruction a dependence count of 0. Otherwise, critical load ordering unit 305 uses dependency analyzer 340 to analyze the instruction to determine which, if any, candidate loads in candidate load buffer 330 the instruction depends on. Note that a single instruction might not depend on any candidate loads (in which case the instruction may be executed out of order), might depend on only one candidate load (for example, the instruction might perform a shift on the register storing the loaded value), or might depend on any number of candidate loads (for example, a summation of loaded values). Critical load ordering unit 305 then increments the dependence count associated with each candidate load in candidate load buffer 330 on which the instruction depends.

Figure 4:
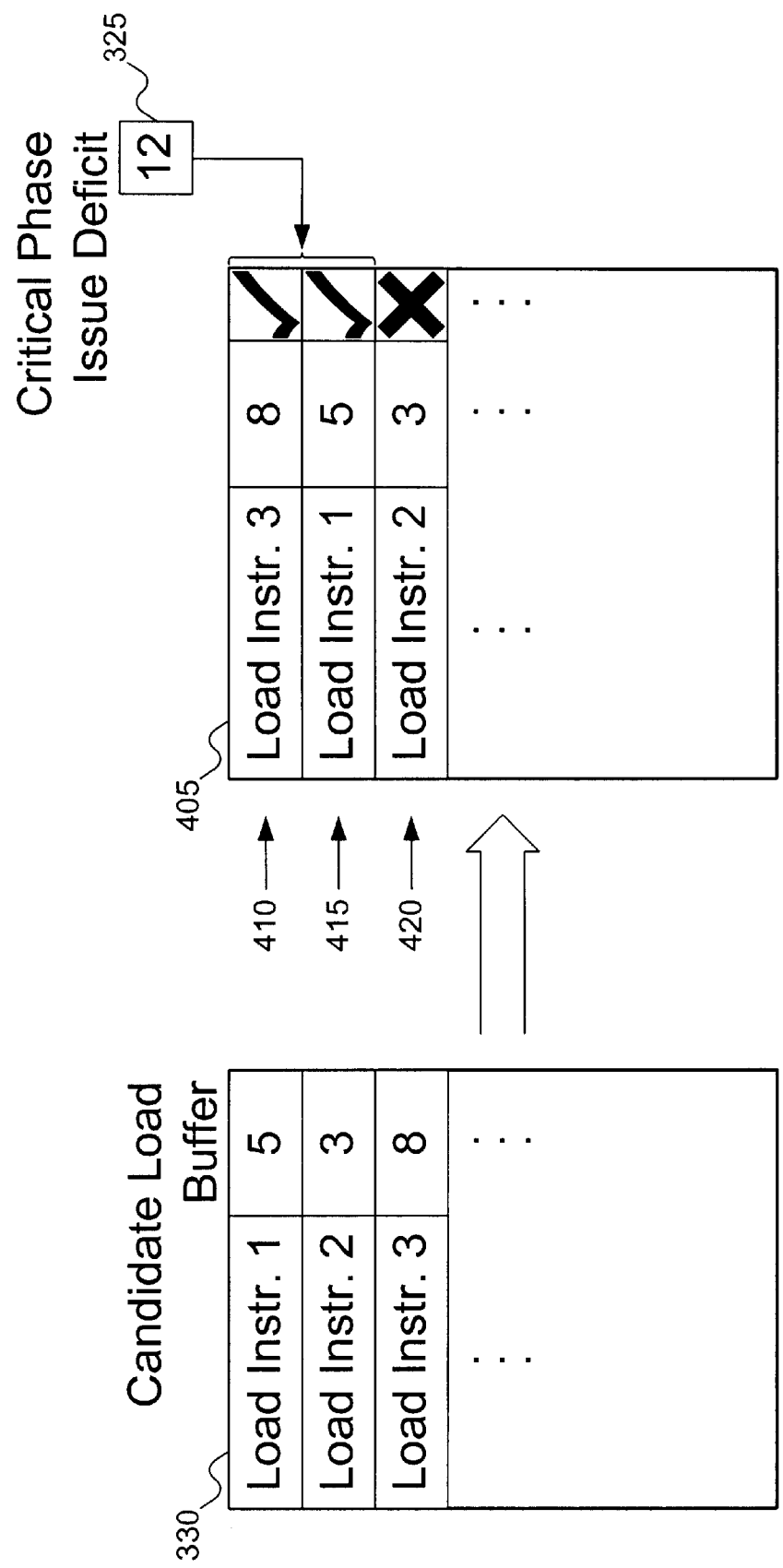
FIG. 4 shows the critical load ordering unit of FIG. 3 ordering candidate loads and identifying some of the candidate loads as critical loads.

FIG. 4 shows the critical load ordering unit of FIG. 3 ordering candidate loads and identifying some of the candidate loads as critical loads. In FIG. 4, the critical phase has completed, and candidate load buffer 330 is set. Candidate load buffer 330 is then sorted by dependence count to identify the load instructions with the highest dependency counts. These are the instructions that cause the greatest "ripple effect," delaying later instructions. Once candidate load buffer 330 is sorted (as shown in sorted buffer 405), candidate load instructions are marked as critical, so that they can be given preferential processing. In an embodiment of the invention, instructions are marked as critical until the sum of their dependency counts exceeds critical phase issue deficit 325. But a person skilled in the art will recognize other techniques that can be used to select candidate loads as critical loads. For example, in FIG. 4, candidate load instructions 410 and 415 are selected as critical loads, because the sum of their dependency counts exceeds critical phase issue deficit 325, whereas candidate load instruction 420 is not marked as critical.

Figure 5A:
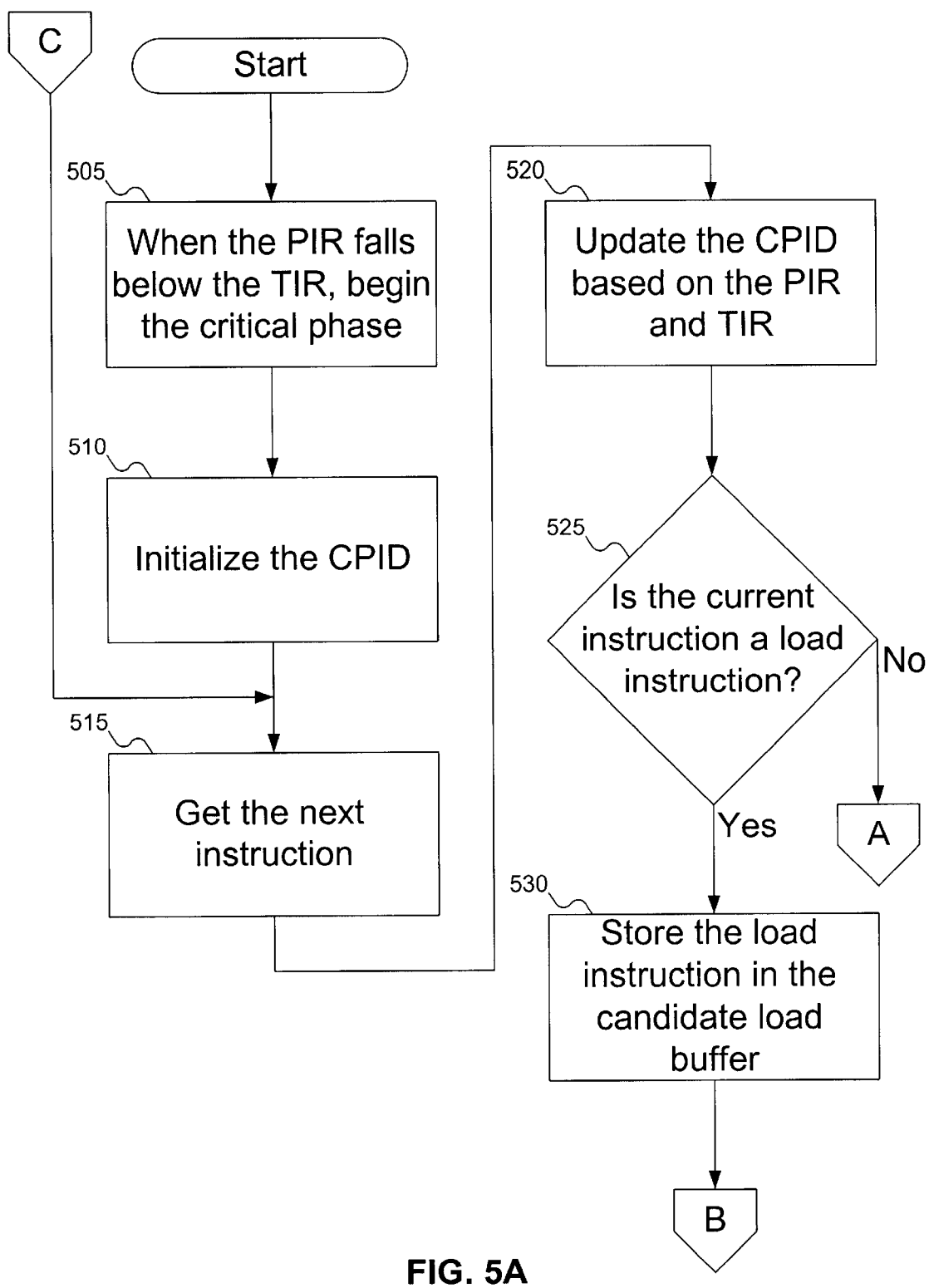
FIGS. 5A and 5B show the procedure used by the critical load ordering unit of FIG. 3 to identify candidate loads, order candidate loads, and identify critical loads.
Figure 5B:
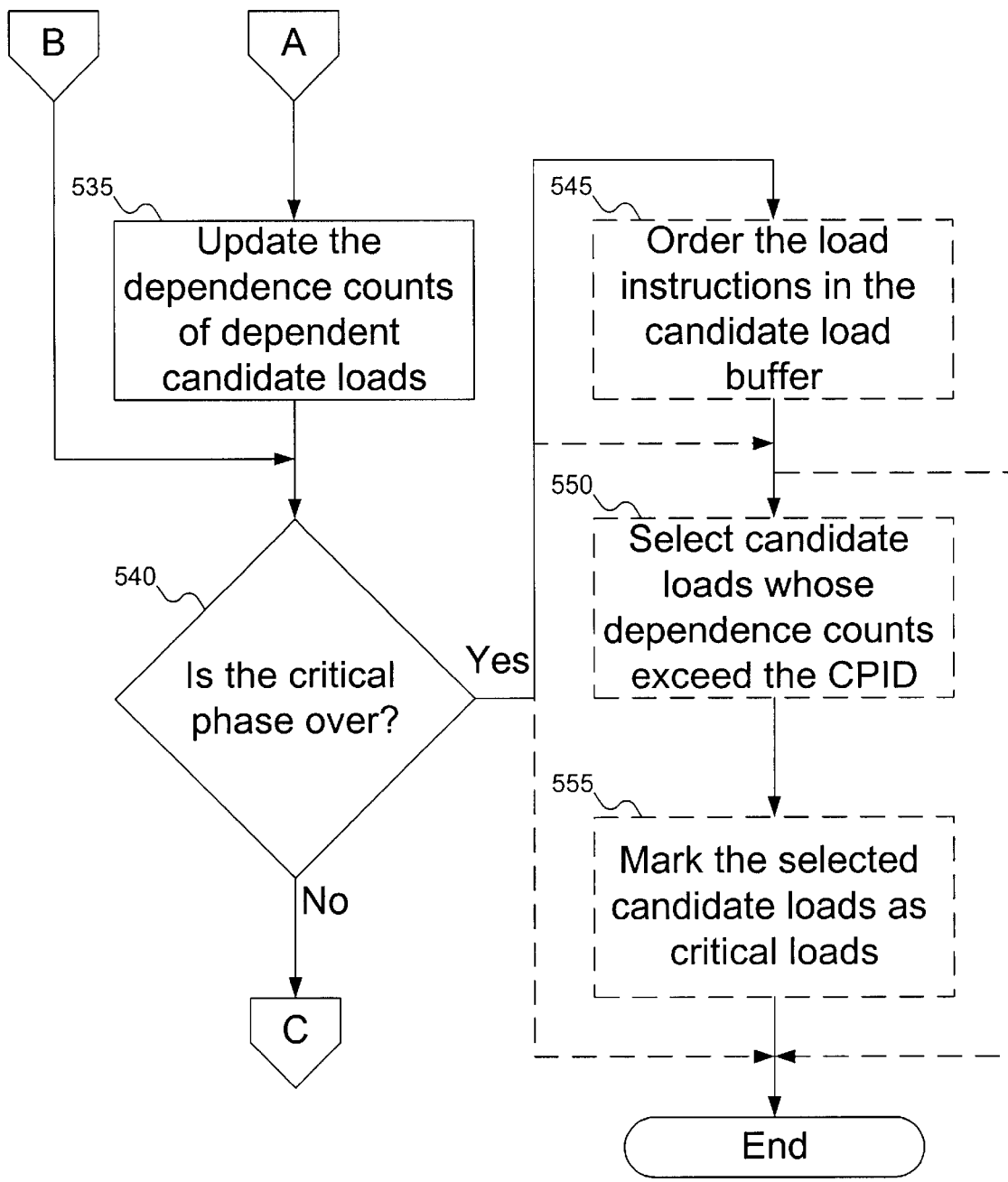

FIGS. 5A and 5B show the procedure used by the critical load ordering unit of FIG. 3 to identify candidate loads, order candidate loads, and identify critical loads. At block 505, the critical phase is begun when the processor issue rate (PIR) falls below the target issue rate (TIR). At block 510, the critical phase issue deficit (CPID) is initialized, and at block 515 the next instruction is received. At block 520, the critical phase issue deficit is updated based on the processor issue rate and the target issue rate. In an embodiment of the invention, the critical phase issue deficit is increased by the difference between the target issue rate and the processor issue rate, but a person skilled in the art will recognize that other techniques can be used to update the critical phase issue deficit.

At decision point 525, the current instruction is examined to see if it is a load instruction or not. If the current instruction is a load instruction, then at block 530 the load instruction is stored in the candidate load buffer. Otherwise, at block 535 the dependence counts of candidate loads in the candidate load buffer are updated based on whether or not the current instruction depends on the candidate load. At decision point 540, the critical load ordering unit checks to see if the critical phase is complete. As discussed above, in an embodiment of the invention, the critical phase lasts for a fixed number of cycles. If the critical phase is not over, the procedure returns to block 515. Otherwise, at block 545 the candidate load instructions are ordered by their dependence counts. At block 550, a minimal set of candidate loads is selected. As discussed above, in an embodiment of the invention, the selected candidate loads are those for which the sum of their dependence counts exceeds the critical phase issue deficit. Finally, at block 555, the selected candidate loads are marked as critical loads.

Although in an embodiment of the invention, the candidate loads in the candidate load buffer are ordered and some marked as critical, a person skilled in the art will recognize that both ordering the instructions and marking loads as critical are optional. For example, the candidate load buffer may be ordered as in block 545, but no loads marked as critical. Alternatively, candidate loads may be marked as critical as in blocks 550 and 555, but without ordering the candidate loads.

A person skilled in the art will recognize that, when instructions are processed out of order, executing critical loads earlier improves processor performance. Since more instructions are dependent on critical loads than on non-critical loads, completing critical loads earlier allows for more instructions to be executed out-of-order without buffering.

The reader may question the purpose of critical load ordering, as load instructions are not marked as critical until after they are executed. The purpose lies in future execution of the instructions. It may happen that the program includes a loop. The next time the loop is executed, information about the load instructions within the loop enables the processor to more efficiently order the instructions for out-of-order execution.

Figure 6:
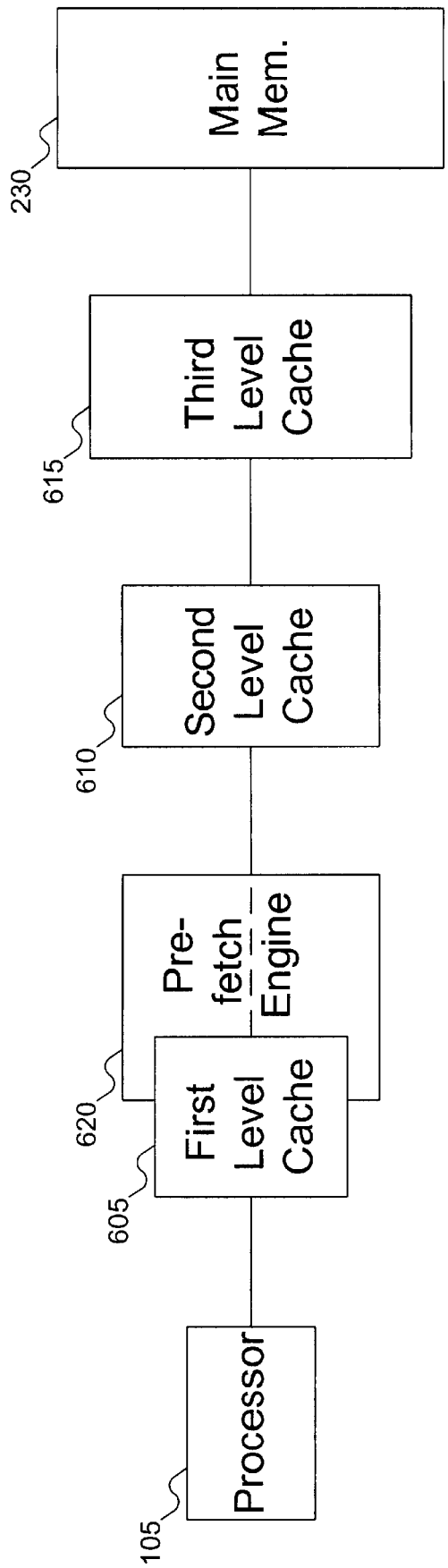
FIG. 6 shows a cache hierarchy for the computer system of FIG. 2 including three levels of cache, with one level of cache including a prefetch engine for prefetching critical data.

Critical Loads Guided Data Prefetching:

FIG. 6 shows a cache hierarchy for the computer system of FIG. 2 including three levels of cache, with one level of cache including a prefetch engine for prefetching critical data. In FIG. 6, first level cache 605 is coupled to processor 105. Second level cache 610 is coupled to first level cache 605. Third level cache 615 is coupled to second level cache 610. And memory 230 is coupled to third level cache 615. In a cache hierarchy as shown in FIG. 6, first level cache 605 typically is the fastest cache available, but is also the most expensive and therefore smallest cache. Second level cache 610 is less expensive than first level cache 605 and therefore is larger, but is also typically slower than first level cache 605. Third level cache 615 is larger but slower than second level cache 610, and memory 230 is the largest but slowest data source. A person skilled in the art will recognize that the cache hierarchy of FIG. 6 is for example purposes only: there may be more or fewer caches in the hierarchy between processor 105 and memory 230.

When processor 105 requires data from memory, processor 105 issues a data request to first level cache 605. If first level cache 605 can satisfy the request (a cache hit), first level cache 605 returns the requested data. Otherwise, first level cache 605 generates a cache miss, and requests the data from second level cache 610. Second and third level caches 610 and 615 behave similarly, returning the requested data to the cache higher in the hierarchy.

Coupled to first level cache 605 in FIG. 6 is prefetch engine 620. Prefetch engine 620 is responsible for requesting cache lines from second level cache 610 through memory 230 before processor 105 requests the data (hence the name "prefetch engine"). But unlike most prefetch engines, prefetch engine 620 only prefetches cache lines it expects to contain critical data.

Prefetch engine 620 operates under the principle of temporal and spatial locality. Temporal locality is the concept that requests for data tend to occur at approximately the same time (i.e., point of execution in the program). Spatial locality dictates that loads tend to request data from memory addresses near other referenced data. Under the observation that temporal and spatial locality can be generalized to critical data, when one critical load instruction is encountered, it is reasonable to conclude that there will be other critical load instructions coming up shortly (temporal locality), which will request data from memory addresses near the first critical load (spatial locality).

Figure 7:
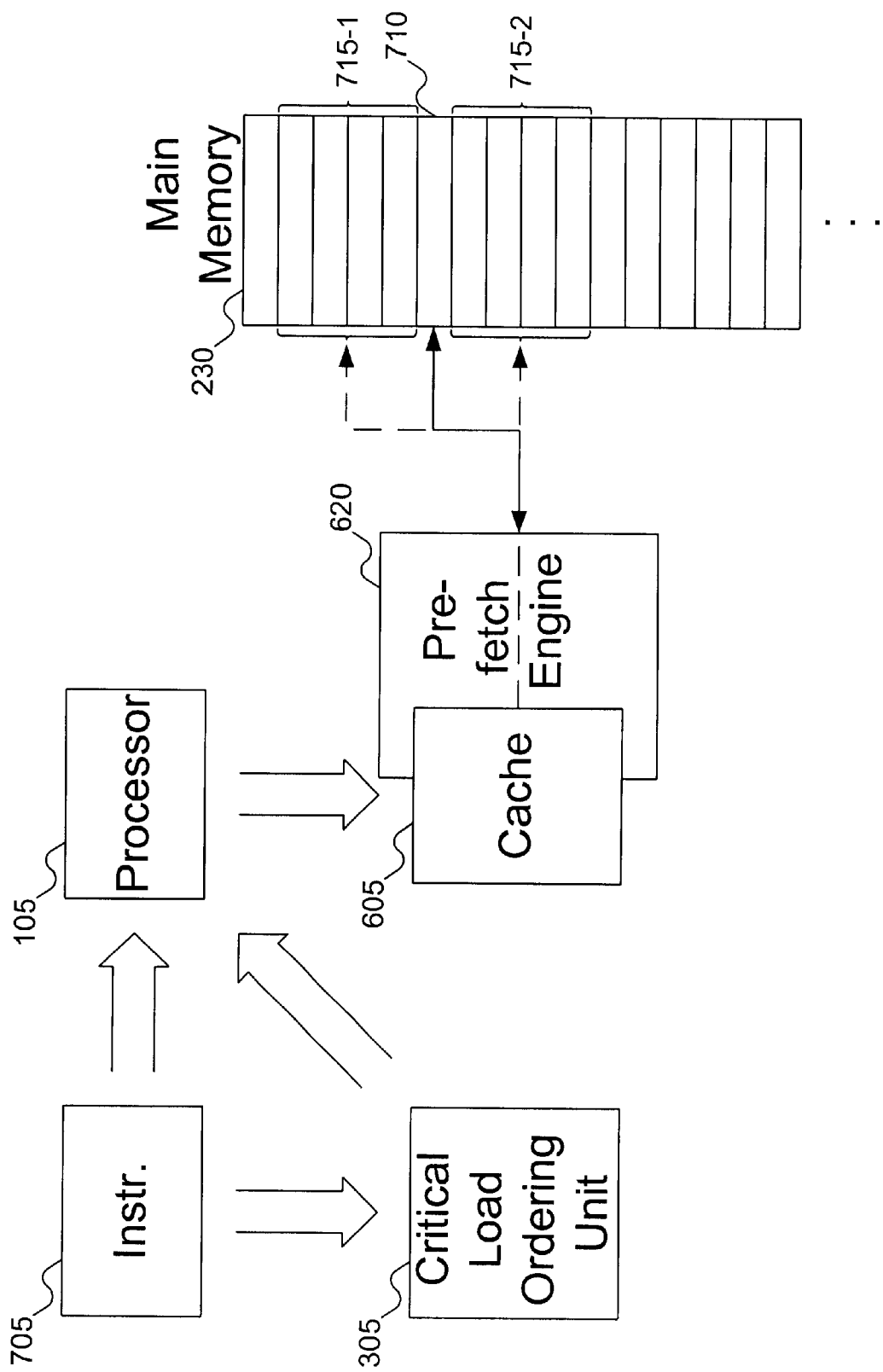
FIG. 7 shows the prefetch engine of FIG. 6 being used to prefetch critical data from main memory into the cache.

FIG. 7 shows the prefetch engine of FIG. 6 being used to prefetch critical data from main memory into the cache. In FIG. 7, instruction 705 is input to processor 105. Instruction 705 is also processed at some point by critical load ordering unit 305 to determine whether instruction 705 is a critical load instruction. A person skilled in the art will also recognize that any mechanism that identifies a load instruction as critical or non-critical can be used in place of critical load ordering unit 305 in FIG. 7. Processor 105 then requests the data from cache 605. Processor 105 also marks the data request as critical if it comes from a critical load instruction. If cache 605 can satisfy the data request (i.e., a cache hit occurs), the requested data is returned to processor 105 without prefetch engine 620 prefetching any data. But if cache 605 cannot satisfy the data request (i.e., a cache miss occurs), cache 605 requests the cache line satisfying the data request from memory 230.

Prefetch engine 620 detects the cache miss, and checks to see if the data request was flagged as critical by the processor. If the data request was non-critical, then prefetch engine 620 does nothing. As a result, only the cache line that satisfies the data request is retrieved from memory 230: for example, cache line 710. But if the data request was critical, then prefetch engine 620 requests cache lines surrounding cache line 710. For example, prefetch engine 620 may request surrounding cache lines 715-1 and 715-2. Although four cache lines on either side of the cache line satisfying the data request are prefetched in FIG. 7, a person skilled in the art will recognize that any number of surrounding cache lines may be retrieved. In an embodiment of the invention, the number of surrounding cache lines retrieved is a tunable parameter.

Figure 8:
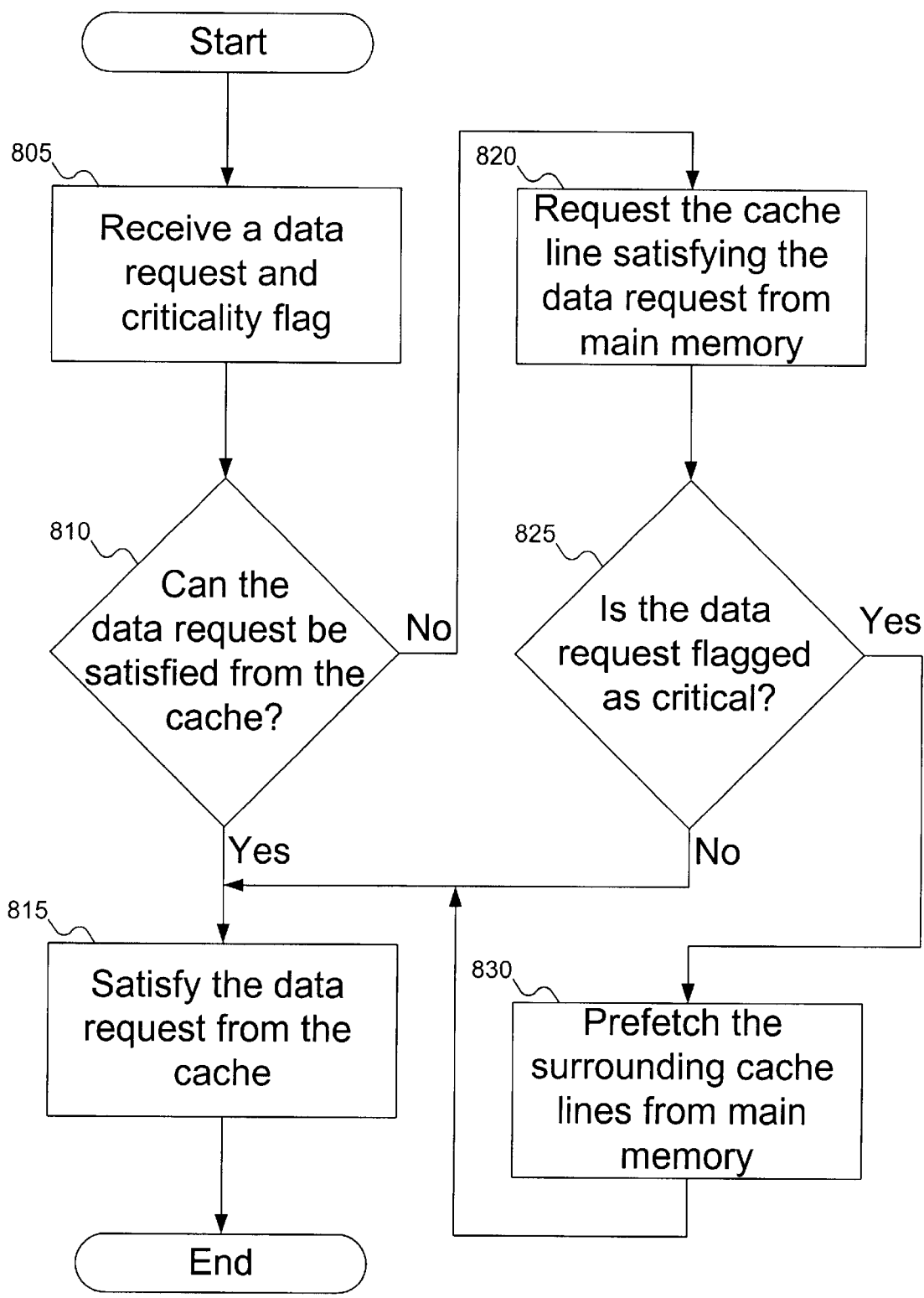
FIG. 8 shows the procedure used by the prefetch engine of FIG. 6 to prefetch critical data from main memory into the cache.

FIG. 8 shows the procedure used by the prefetch engine of FIG. 6 to prefetch critical data from main memory into the cache. At block 805, the cache receives a data request and criticality flag from the processor. At decision point 810, the cache checks to see if there is a cache hit. If there is, then at block 815, the data request is returned from the cache. Otherwise, at block 820, the cache line that may satisfy the data request is requested from the main memory. At decision point 825, the prefetch engine checks to see if the data request was flagged as critical. If the data request was marked as critical, then at block 830, surrounding cache lines are prefetched from memory. Then, regardless of whether surrounding cache lines are prefetched, once the cache line is loaded from main memory, the procedure returns to block 815 to satisfy the data request from the cache.

Figure 9A:
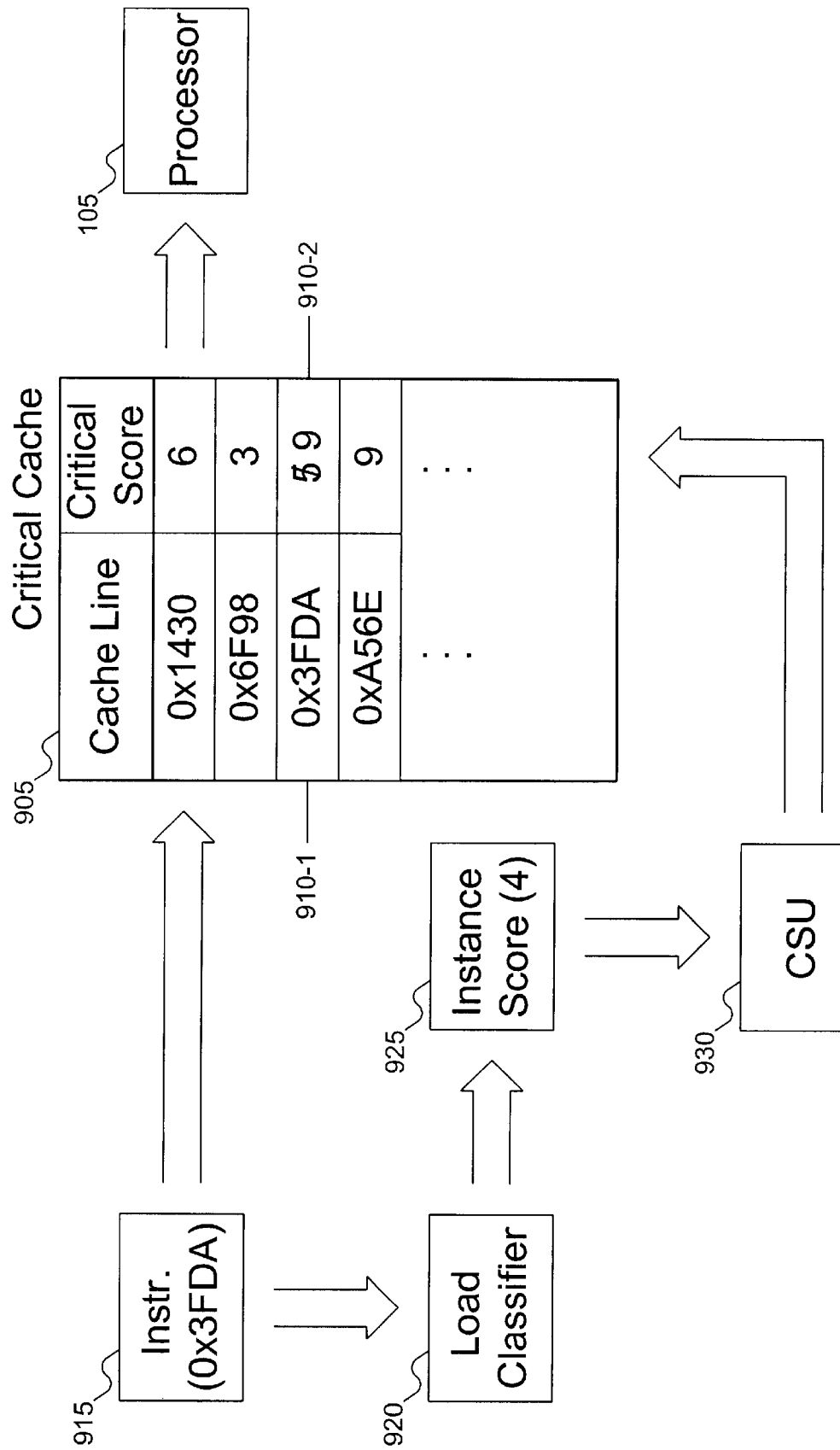
FIGS. 9A–9C show a critical cache implementing a least critical used replacement policy operable on the computer system of FIG. 2, performing update, bypass, and allocation operations based on cache hits/misses.
Figure 9B:
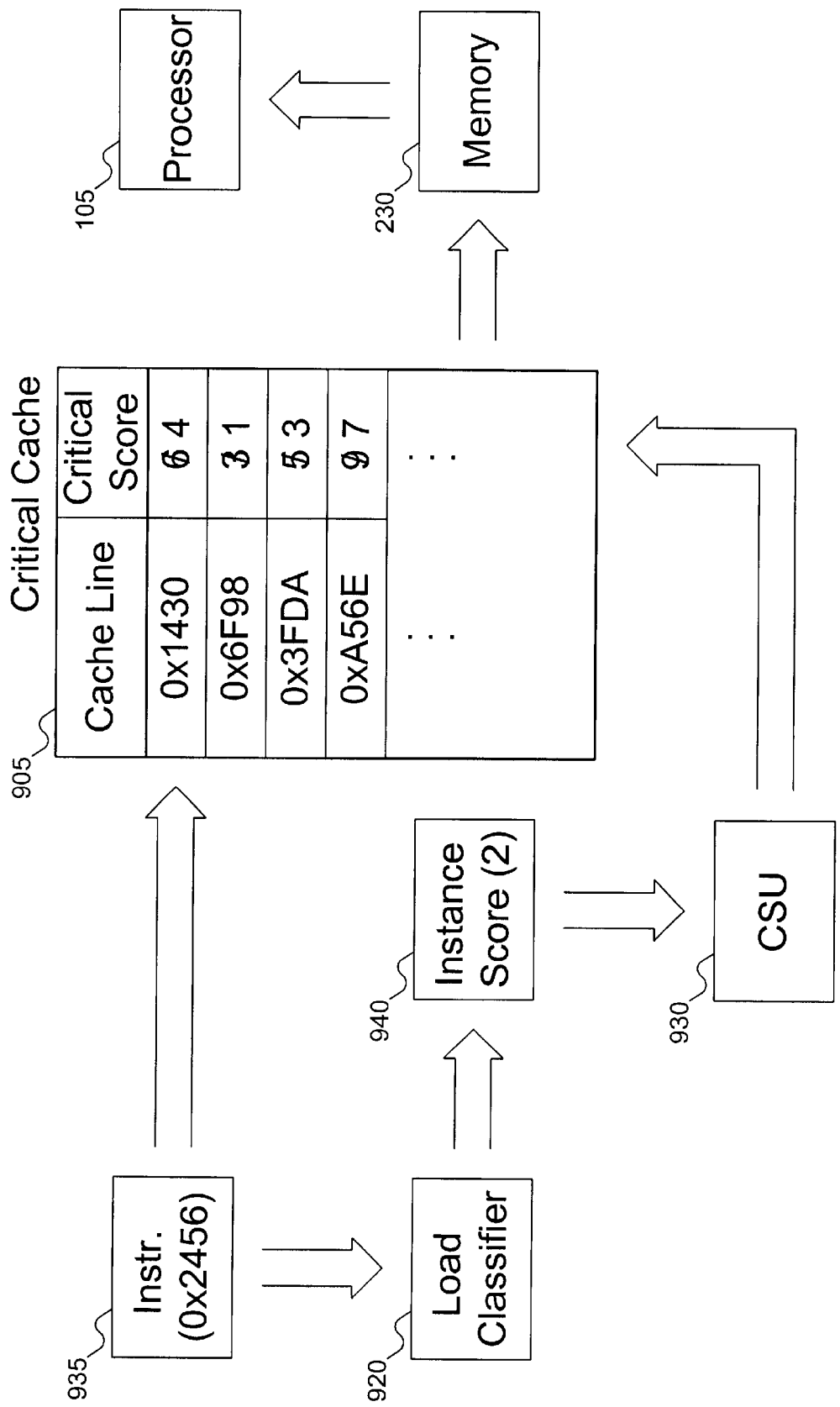
Figure 9C:
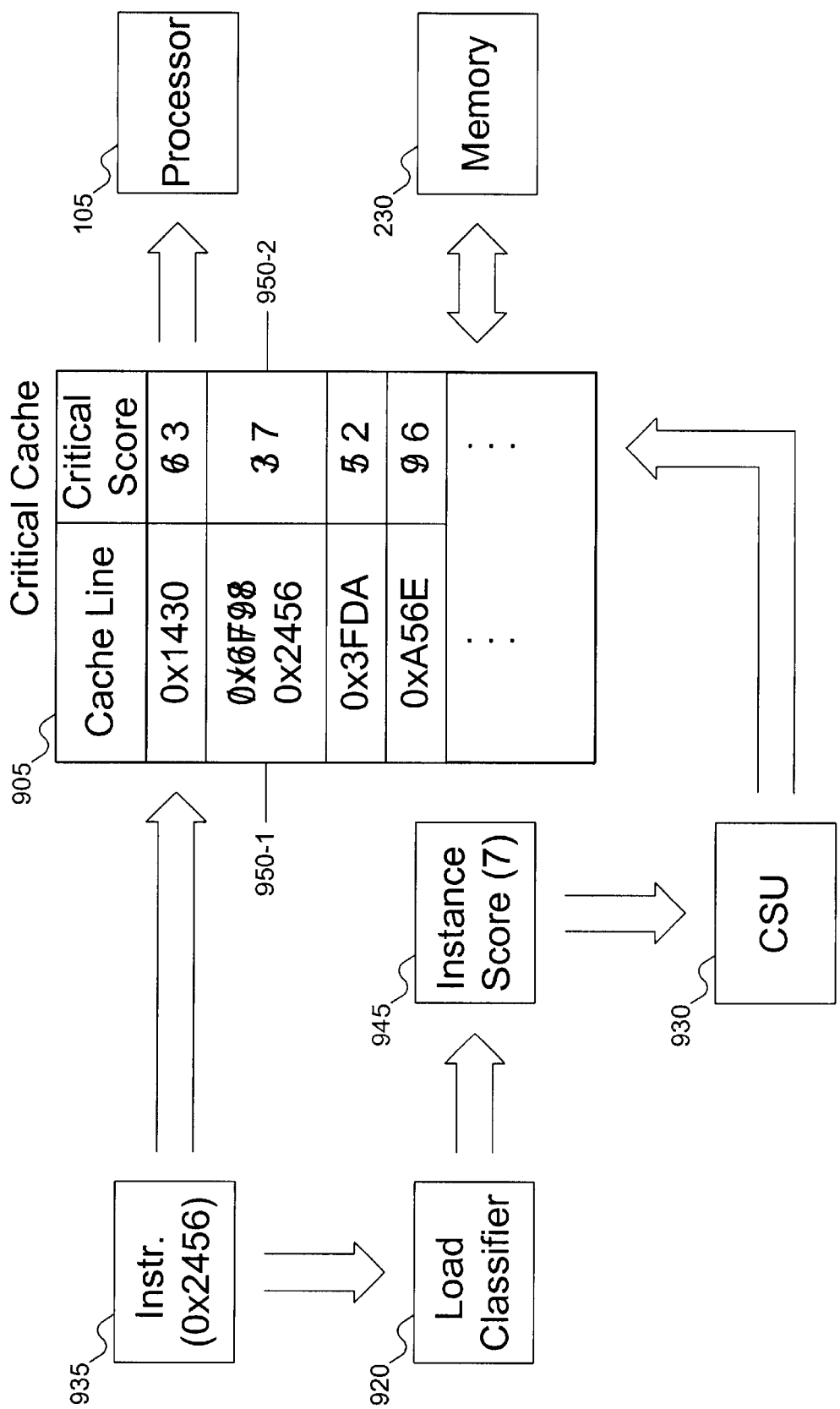

Critical Cache and Least Critical Used Cache Replacement Policy:

FIGS. 9A–9C show a critical cache implementing a least critical used replacement policy operable on the computer system of FIG. 2, performing update, bypass, and allocation operations based on cache hits/misses. (A person skilled in the art will recognize that the mane "critical cache" is used to identify the cache, and that other names can be used to identify the cache.) Critical cache 905 includes the cache lines storing data, and also stores a critical score for each cache line. For example, in FIG. 9A, cache line 0x3FDA (910-1) was originally assigned a critical score of 5 (910-2).

In FIG. 9A, instruction 915 requires data from cache line 0x3FDA. Instruction 915 is passed to load classifier 920, which determines whether instruction 915 is a critical instruction, and assigns instance score 925 to instruction 915. The request for data from memory address 0x3FDA is provided to critical cache 905. Instance score 925 is provided to critical score updater 930. Because cache line 0x3FDA (910-1) is currently in critical cache 905, a cache hit occurs. Critical score updater 930 updates the critical score for cache line 0x3FDA (910-1) by incrementing its associated critical score (910-2) by instance score 925. The data is then accessed and returned to processor 105.

In FIG. 9B, instruction 935 requires data from cache line 0x2456. Instruction 935 is passed to load classifier 920, which determines whether instruction 935 is a critical instruction, and assigns instance score 940 to instruction 935. The request for data from memory address 0x2456 is provided to critical cache 905. Instance score 940 is provided to critical score updater 930. Because least critical used cache 905 does not currently include cache line 0×2456, a cache miss occurs. Instance score 940 is then accessed and compared to the critical scores of all cache lines in critical cache 905. Because instance score 940 is less than all critical scores assigned to cache lines in critical cache 905, a bypass operation is performed. Critical score updater 930 updates the critical scores for all of the cache lines by deducting instance score 940 from each cache line's critical score. This effectively ages the cache lines in critical cache 905. The data is then directly accessed from memory 230 without allocating a new cache line in critical cache 905, and is delivered to processor 105.

In FIG. 9C, instruction 935 requires data from cache line 0×2456. Instruction 935 is passed to load classifier 920, which determines whether instruction 935 is a critical instruction, and assigns instance score 945 to instruction 935. The request for data from memory address 0×2456 is provided to least critical used cache 905. Instance score 945 is provided to critical score updater 930. Because critical cache 905 does not currently include cache line 0×2456, a cache miss occurs. Instance score 945 is then accessed and compared to the critical scores of all cache lines in critical cache 905. Because instance score 945 is larger than the minimal critical score in critical cache 905, an allocation operation is performed. Critical score updater 930 updates the critical scores for all of the cache lines by subtracting the smallest critical score in critical cache 905 (in this case, critical score 950-2) from the critical scores of all other cache lines. The data is accessed from memory 230 and new cache line 950-1 is allocated, replacing the existing cache line. Critical score updater 930 then assigns instance score 945 to the newly allocated cache line 950-1 as critical score 950-2, and the requested data is delivered to processor 105.

Figure 10A:
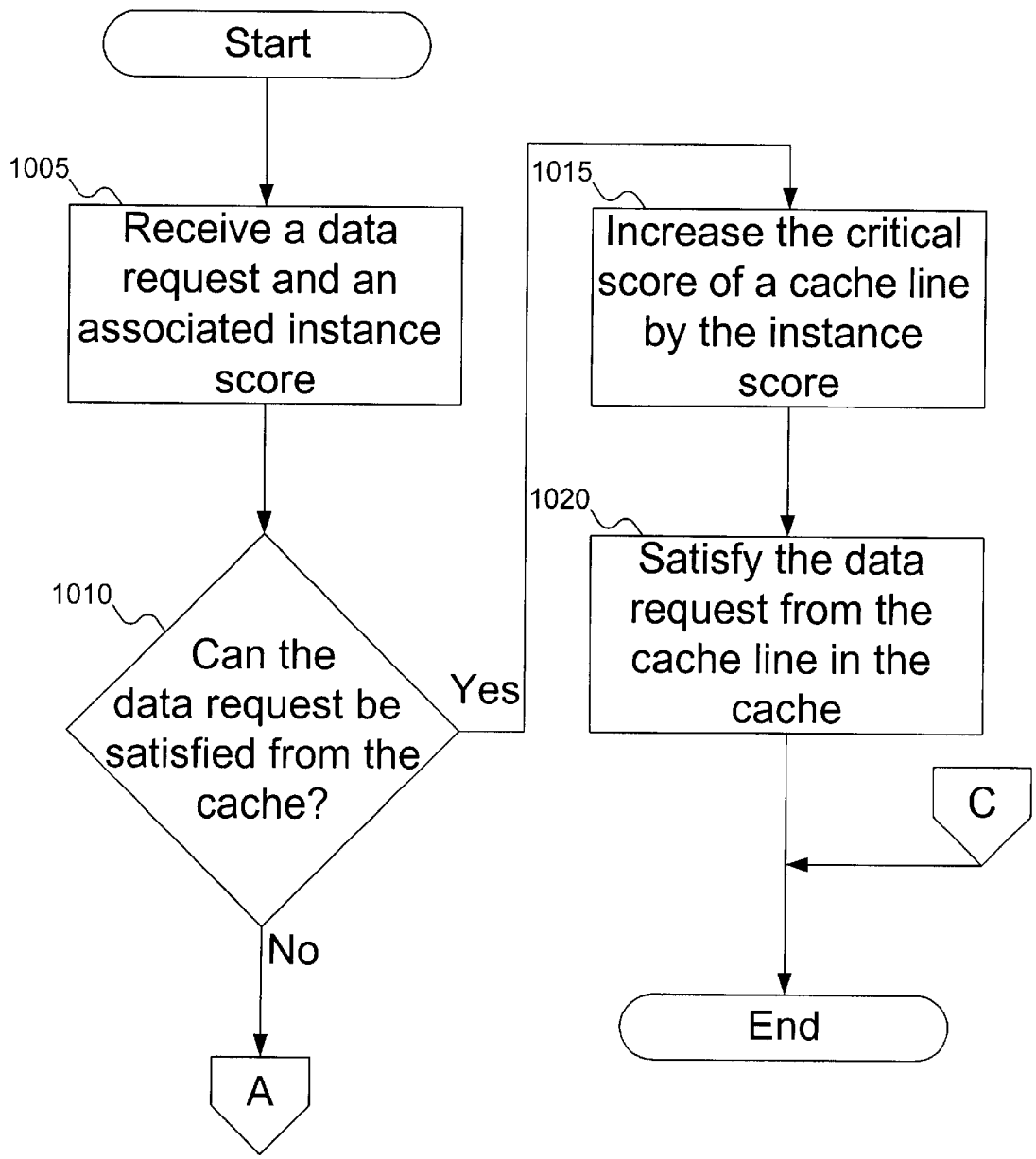
FIGS. 10A–10C show the procedure used by the critical cache of FIGS. 9A–9C to update and replace cache lines according to a least critical used cache line replacement policy.
Figure 10B:
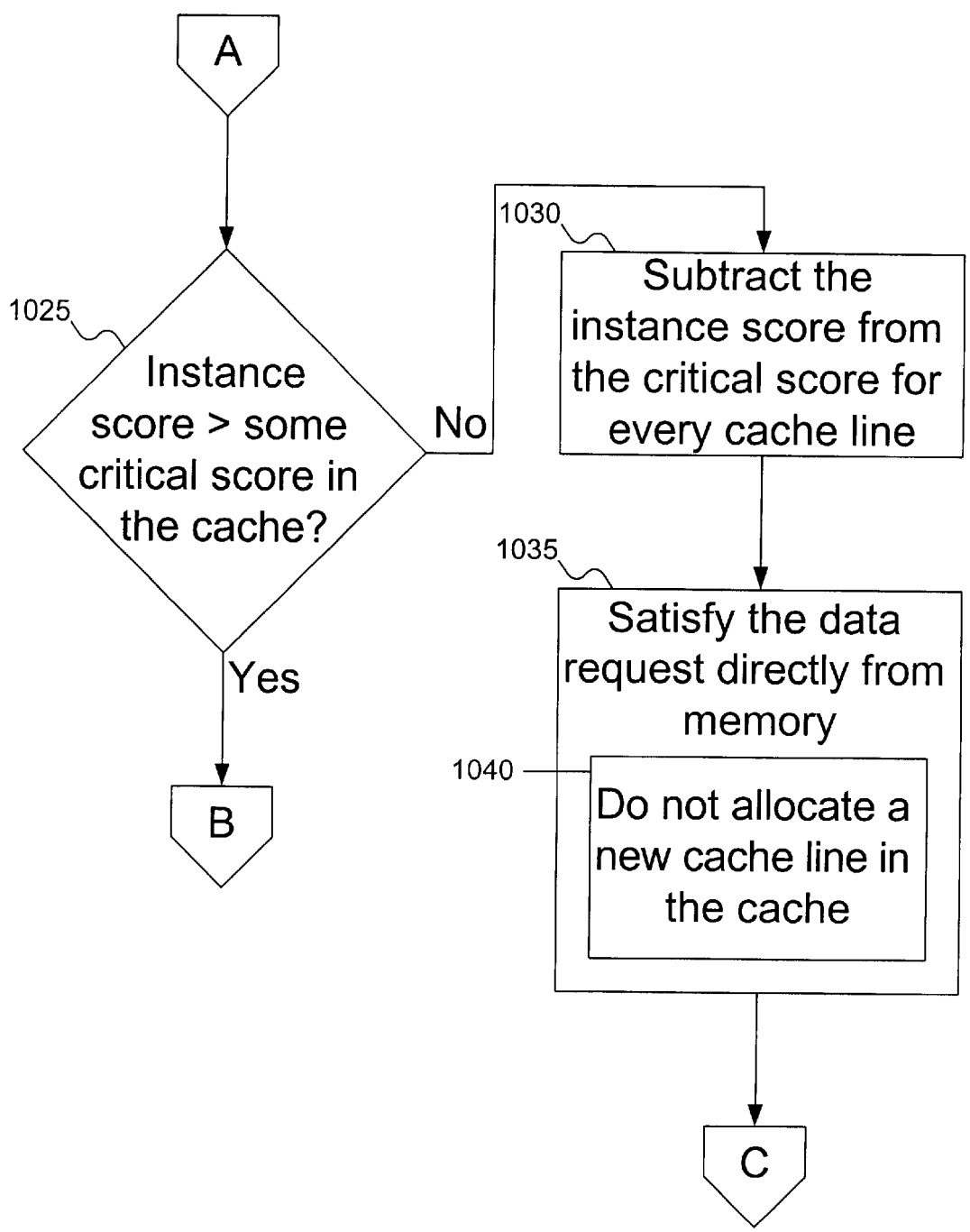
Figure 10C:
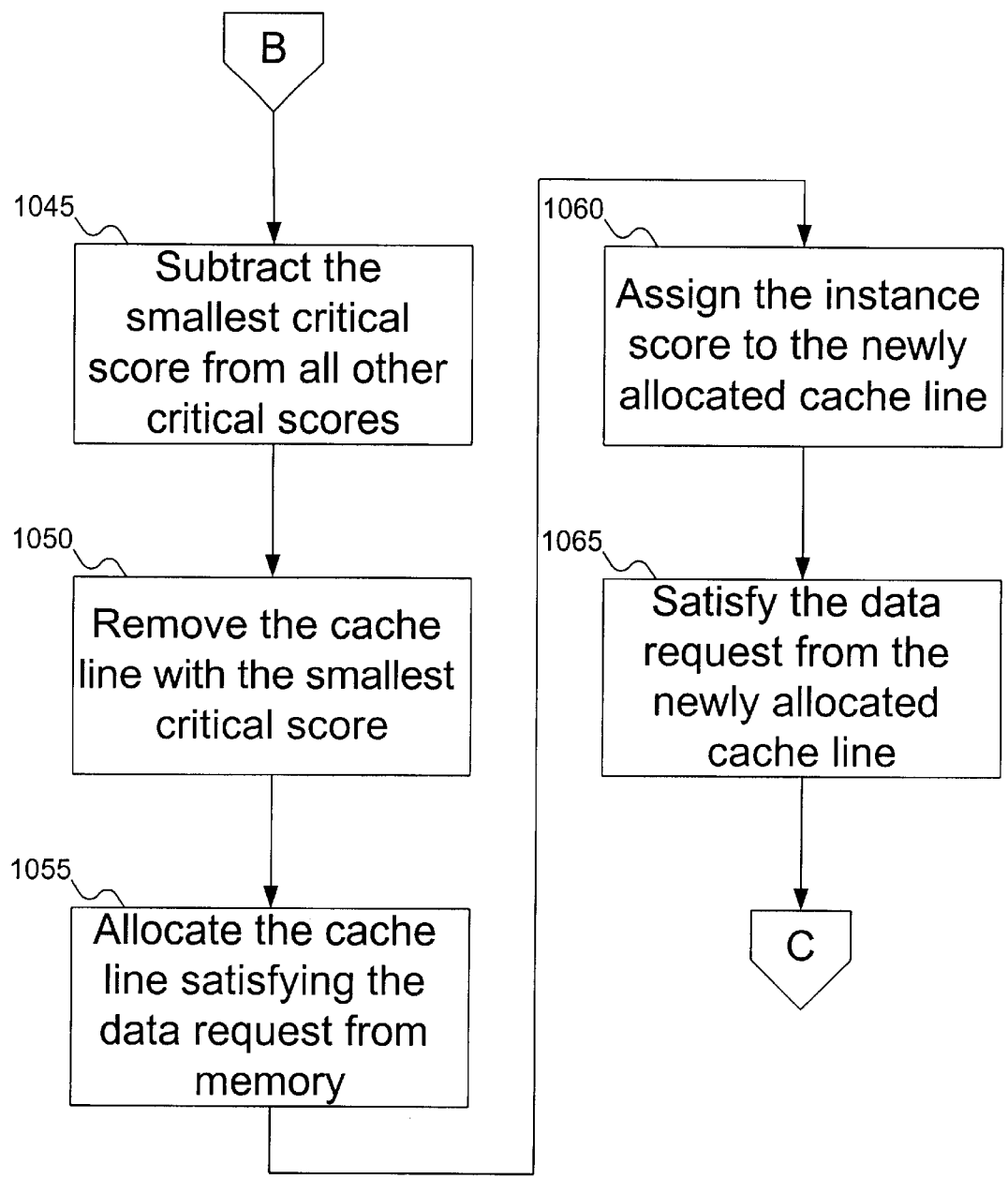

FIGS. 10A–10C show the procedure used by the critical cache of FIGS. 9A–9C to update and replace cache lines according to a least critical used cache line replacement policy. At block 1005, the critical cache receives a data request and an instance score associated with the data request. At decision point 1010, the critical cache checks to see if it can satisfy the data request (i.e., a cache hit). If a cache hit occurs, then at block 1015 the critical cache updates the critical score of the cache line satisfying the data request by adding the data request's instance score to the critical score. At block 1020, the critical cache returns the requested data to the processor.

If instead at decision point 1010 a cache miss occurred, then at decision point 1025, the critical cache compares the instance score associated with the data request with the critical scores of cache lines in the critical cache. If the instance score is less than all of the critical scores in the critical cache, a bypass operation is performed. At block 1030, the critical cache subtracts the instance score from the critical score for each cache line in the critical cache. This ages the cache lines. Then at block 1035, the data request is satisfied directly from memory. As indicated at block 1040, no new cache line is allocated for the critical cache, despite a cache miss having occurred.

If instead at decision point 1025 the instance score is at least as large as one of the critical scores in the critical cache, an allocation operation is performed. At block 1045, the smallest critical score in the critical cache is subtracted from all other critical score. This ages the other cache lines. At block 1050, the cache line with the smallest critical score (selected earlier at block 1045) is removed from the critical cache. At block 1055, a new cache line is allocated containing the data requested by the processor. At block 1060, the instance score is assigned to the newly allocated cache line as its critical score. Finally, at block 1065, the data request is satisfied from the newly allocated cache line.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

We claim:

1. A method for using a cache in a computer, the method comprising:
   receiving a data request;
   receiving an instance score for the data request;
   determining if the data request can be satisfied by the cache, the cache including a cache line, the cache line including an assigned critical score; and
   using the instance score for the data request to update the critical score for the cache line if the data request resulted in a cache miss or a cache hit.

2. A method according to claim 1, wherein determining if the data request can be satisfied by the cache includes assigning the critical score determined by a load classifier to the cache line.

3. A method according to claim 2, wherein assigning the critical score determined by a load classifier to the cache line includes assigning the critical score determined by the load classifier to the cache line in response to the cache line being loaded into the cache.

4. A method according to claim 1, wherein:
   determining if the data request can be satisfied includes determining that the data request results in a cache hit; and
   using the instance score includes adding the instance score for the data request to the critical score assigned to the cache line if the received data request can be satisfied by the cache line.

5. A method according to claim 1, wherein determining if the data request can be satisfied includes determining that the data request results in a cache miss and a bypass operation.

6. A method according to claim 5, wherein using the instance score includes subtracting the instance score for the data request from the critical score assigned to the cache line.

7. A method according to claim 5, the method further comprising satisfying the data request from a memory without loading a new cache line into the cache.

8. A method according to claim 5, wherein the instance score for the data request is less than the critical score assigned to the cache line.

9. A method according to claim 1, wherein determining if the data request can be satisfied includes determining that the data request results in a cache miss and an allocation operation.

10. A method according to claim 9, wherein:
    the method further comprises:
       subtracting the critical score assigned to the cache line from a second critical score assigned to a second cache line in the cache;
       requesting a new cache line from memory; and
       replacing the cache line with the new cache line; and
    using the instance score includes assigning the instance score to the new cache line as a critical score.

11. A method according to claim 9, wherein the instance score for the data request is greater than the critical score assigned to the cache line.

12. A method according to claim 11, wherein the critical score assigned to the cache line is less than a second critical score assigned to a second cache line.

13. An article comprising:
    a storage medium, said storage medium having stored thereon instructions, that, when executed by a computing device, result in:

receiving a data request;
receiving an instance score for the data request;
determining if the data request can be satisfied by the cache, the cache including a cache line, the cache line including an assigned critical score; and
using the instance score for the data request to update the critical score for the cache line if the data request resulted in a cache miss or a cache hit.

14. An article according to claim 13, wherein determining if the data request can be satisfied by the cache includes assigning the critical score determined by a load classifier to the cache line.

15. An article according to claim 13, wherein:
determining if the data request can be satisfied includes determining that the data request results in a cache hit; and
using the instance score includes adding the instance score for the data request to the critical score assigned to the cache line if the received data request can be satisfied by the cache line.

16. An article according to claim 13, wherein determining if the data request can be satisfied includes determining that the data request results in a cache miss and a bypass operation.

17. An article according to claim 16, wherein using the instance score includes subtracting the instance score for the data request from the critical score assigned to the cache line.

18. An article according to claim 16, the storage medium having stored thereon further instructions, that, when executed by the computing device result in satisfying the data request from a memory without loading a new cache line into the cache.

19. An article according to claim 13, wherein determining if the data request can be satisfied includes determining that the data request results in a cache miss and an allocation operation.

20. An article according to claim 19, wherein:
the storage medium having stored thereon further instructions, that, when executed by the computing device result in:
subtracting the critical score assigned to the cache line from a second critical score assigned to a second cache line in the cache;
requesting a new cache line from memory; and
replacing the cache line with the new cache line; and
using the instance score includes assigning the instance score to the new cache line as a critical score.

21. An apparatus comprising:
a computer including a processor and a memory;
a load classifier to identify critical load instructions and assign an instance score to a data request;
a cache including a plurality of cache lines, each cache line including an associated critical score; and
a critical score updater to update the critical scores associated with the cache lines in the cache in response to a data request.

22. An apparatus according to claim 21, the apparatus further comprising a cache line allocator to allocate new cache lines into the cache.

23. An apparatus according to claim 21, the apparatus further comprising a bypass mechanism to access a data request from memory without allocating a new cache line into the cache.

24. An apparatus according to claim 21, wherein the critical score updater uses the instance score to update the critical score associated with one of the cache lines in response to a cache hit.

25. An apparatus according to claim 21, wherein the cache designates a bypass operation in response to a cache miss occurring and the instance score assigned to the data request being less than any of the critical scores assigned to the cache lines in the cache.

26. An apparatus according to claim 25, wherein the cache satisfies the data request from the memory without allocating a new cache line to the cache during a bypass operation.

27. An apparatus according to claim 25, wherein the critical score updater uses the instance score to reduce the critical scores associated with all cache lines during a bypass operation.

28. An apparatus according to claim 21, wherein the cache designates an allocation operation in response to a cache miss occurring and the instance score assigned to the data request being greater than a first critical score assigned to a first cache line in the cache.

29. An apparatus according to claim 28, wherein the cache replaces the first cache line with a cache line from the memory satisfying the data request.

30. An apparatus according to claim 28, wherein the critical score updater reduces the critical score assigned to each cache line in the cache by the first critical score.

31. An apparatus according to claim 28, wherein the critical score updater replaces the first critical score associated with the first cache line and to use the instance score to reduce the critical scores associated with all other cache lines in response to an allocation operation.

32. An apparatus comprising:
a computer including a processor and a memory, the memory including a plurality of cache lines, each cache line including at least one memory address;
a critical load ordering unit to identify critical load instructions executed by the processor; and
a cache to satisfy data requests from the processor.

33. An apparatus according to claim 32, wherein the critical load ordering unit includes:
a candidate load buffer stored in the memory to buffer at least one candidate load;
a dependence counter associated with each candidate load in the candidate load buffer; and
a flag setter to set a critical phase flag stored in the computer in response to a critical phase beginning.

34. An apparatus according to claim 32, wherein the critical load ordering unit identifies a load instruction as a critical load and to assign a high instance score to the data request.

35. An apparatus according to claim 32, wherein the critical load ordering unit identifies a load instruction as a non-critical load and to assign a low instance score to the data request.

36. An apparatus according to claim 32, wherein the critical load ordering unit uses a dependence count associated with a load instruction as an instance score for the load instruction.

37. An apparatus according to claim 32, wherein:
the cache includes at least one cache line, the cache line including an associated critical score; and
the cache updates the critical score associated with the cache line in the cache based on an instance score assigned to a data request from the processor.

38. An apparatus according to claim 37, wherein the instance score is assigned to the data request if the critical load ordering unit identified the data request as critical.

* * * * *